United States Patent [19]

Byerley

[11] Patent Number: 4,780,171
[45] Date of Patent: Oct. 25, 1988

[54] TIRE BUILDING MACHINE

[75] Inventor: Mark S. Byerley, Greenback, Tenn.

[73] Assignee: WYKO Incorporated, Greenback, Tenn.

[21] Appl. No.: 85,418

[22] Filed: Aug. 13, 1987

[51] Int. Cl.⁴ .......................................... B29D 30/08
[52] U.S. Cl. .................................. 156/417; 74/99 A
[58] Field of Search ............... 156/415, 417, 414, 415; 74/22 R, 25, 99 A, 99 R

[56] References Cited

U.S. PATENT DOCUMENTS

| 977,288 | 11/1910 | Euchenhofer | 74/99 |
|---|---|---|---|
| 2,201,469 | 5/1940 | Bostwick | 156/419 |
| 3,375,154 | 3/1968 | Ruttenberg et al. | 156/418 |
| 3,391,722 | 7/1968 | Ligh | 74/89 |
| 3,873,398 | 3/1975 | Yokoo et al. | 156/417 |
| 4,203,328 | 5/1980 | DeBoynton | 74/89 |
| 4,392,899 | 7/1983 | Bertoldo | 156/417 |
| 4,436,574 | 3/1984 | Long et al. | 156/417 |
| 4,537,085 | 8/1985 | Valentine | 74/99 A |

FOREIGN PATENT DOCUMENTS

| 692927 | 8/1964 | Canada | 156/415 |
|---|---|---|---|
| 0203360 | 10/1983 | German Democratic Rep. | 74/99 A |
| 0063050 | 5/1980 | Japan | 74/99 R |
| 0589486 | 1/1978 | U.S.S.R. | 74/99 R |
| 1130732 | 10/1968 | United Kingdom . | |
| 2153758A | 8/1985 | United Kingdom . | |

Primary Examiner—Willard Hoag
Attorney, Agent, or Firm—Luedeka, Hodges & Neely

[57] ABSTRACT

A tire building machine is disclosed that includes an adapter for use between a tire building drum and a drive mechanism that would otherwise be incompatible. In one form of the invention a tire building drum has collapsible outer drum segments that are movable between extended and retracted positions, and a rotatable shaft is connected to extend and retract the segments in response to rotation of the shaft. A drive mechanism rotates the drum and also includes an actuation mechanism that moves reciprocally between first and second displaced positions. The adapter rotates the rotatable shaft in response to reciprocal movement of the actuation mechanism and, thereby, extends and retracts the segments. In this construction, a drive mechanism that provides a reciprocating actuation movement can be combined through the adapter to drive a drum which requires a rotating actuation movement.

18 Claims, 8 Drawing Sheets 4,780,171

TIRE BUILDING MACHINE

FIELD OF INVENTION

The present invention relates to tire building machines and particularly relates to a tire building machine having an adapter connected between a tire building drum and a drive mechanism that are incompatible absent the adapter.

BACKGROUND AND SUMMARY OF INVENTION

Typically, tire building drums have a cylindrical body that is rotatable about its axis, and tire carcasses are assembled on this cylindrical body. Once a carcass has been assembled on the body, it is collapsed to facilitate removal of the assembled tire carcass and, for this purpose, the cylindrical body is constructed of a plurality of segments that will collapse inwardly from an extended position to a retracted position. The preferred form of a tire building drum includes radially collapsing segments. These segments are supported on radially extending slide mechanisms, and during the collapsing and extending movement of the segments, they are moved radially by operation of a collapsing mechanism.

In general, there are two types of collapsing mechanisms in current use, one requiring a rotating actuation movement and the other requiring a reciprocating linear actuation movement. An example of a tire building drum requiring a rotating actuation movement to collapse and expand the segments is shown in U.S. Pat. Nos. 4,636,277, and 3,375,154 illustrates a tire building drum requiring a reciprocating linear actuation movement. Drive systems that provide a reciprocal actuation movement have been thought to be incompatible with tire building drums that require a rotational actuation movement, and, in some instances, this incompatibility has forced tire builders to purchase more drums and/or drive systems than would have been necessary if the drive and drum systems were capable.

In accordance with one aspect of the present invention, a tire building machine is provided in which a drum requiring a rotational actuation movement is driven by a drive system that provides a reciprocal actuation movement. One essential element of this system is an adapter that converts reciprocal movement to rotational movement, and in accordance with one embodiment the machine comprises, in combination, a tire building drum having collapsible segments forming an outer periphery and being movable between extended and retracted positions. The tire building drum includes at least one rotatable shaft and a mechanism connects the collapsible segments to the rotatable shaft for moving the segments between the extended and retracted positions in response to rotation of the rotatable shaft. A drive mechanism is provided for rotating the drum and also includes an actuation mechanism that moves between at least first and second displaced positions. An adapter is connected between the actuation mechanism and the rotatable shaft for rotating the rotatable shaft in response to movement of the actuation mechanism between first and second displaced positions. In this manner, the collapsible segments are extended and retracted by the rotation of the rotatable shaft in response to the movement of the actuation mechanism between the first and second displaced positions.

In accordance with a further aspect of the present invention, the adapter includes a cam mechanism that converts rotating movement to reciprocating movement. For example, the adapter may include a cylindrical sleeve mounted in the adapter for rotation about the sleeve's center axis. A groove is formed in the sleeve in an orientation inclined with respect to the center axis of the sleeve, and a pin is disposed for sliding movement in the groove. In the embodiment that converts reciprocal motion to rotating motion, the pin is reciprocally driven and it rotates the sleeve to provide a rotating actuation motion for the drum. When a reciprocating actuation motion is required by a drum, the sleeve is rotatably driven which drives the pin in a reciprocating movement in the slot.

BRIEF DESCRIPTION OF THE DRAWINGS

The present invention may be best understood by reference to the following Detailed Description of preferred embodiments of the invention when considered in conjunction with the Drawings in which.

DETAILED DESCRIPTION

Figure 1:
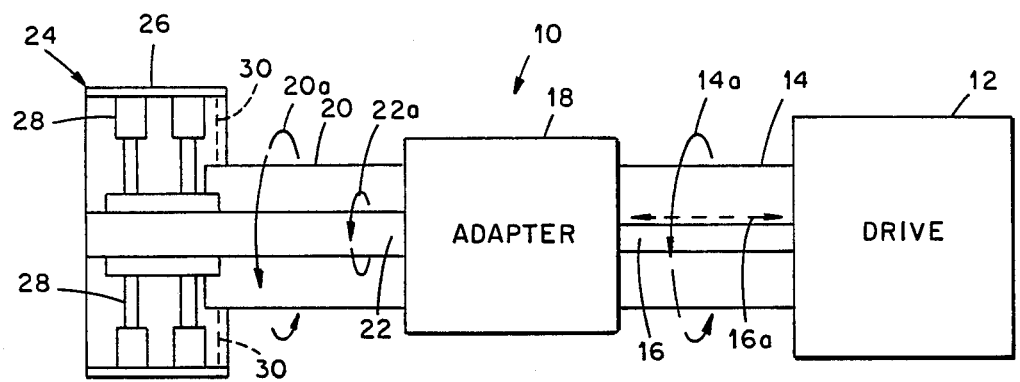
FIG. 1 is a diagrammatic illustration of a drum building system in which a drive provides rotational and reciprocal movement to an adapter which provides two rotational movements to a drum.

Referring now to the drawings in which like reference characters designate like or corresponding parts throughout the several views, there is shown in FIG. 1 a tire building system 10 embodying one form of the present invention. In system 10, a drive 12 is made compatible with a drum 24 by the use of an adapter 18. The drive 12 includes a rotatably driven shaft 14 and a reciprocally driven shaft 16 whose motion is indicated by the dashed arrow lines 14a and 16a, and these two shafts 14 and 16 are input to an adapter 18. Two rotating shafts 20 and 22, whose rotation is indicated by dashed arrow lines 20a and 22a, provide the output of the adapter 18, and this output drives the drum 24. A plurality of drum segments 26 are mounted on the shaft 22 by a plurality of radially extending slides 28, and a mechanical interconnection 30 is provided between shaft 20 and the segments 26 so that rotation of the shaft 20 relative to shaft 22 will cause the segments 26 to move radially between extended positions and retracted positions. In this construction the linear movement of the shaft 16 rotationally moves shaft 20 relative to shaft 22 to either collapse or expand the drum 24. The drum construction is illustrated in UK Pat. No. GB 2 153 758 A, and the disclosure of such patent is incorporated herein by reference. Also, it will be understood that the drive 12 is conventional in design and is suitable to drive drums such as those shown in the aforementioned United Kingom patent.

Figure 2:
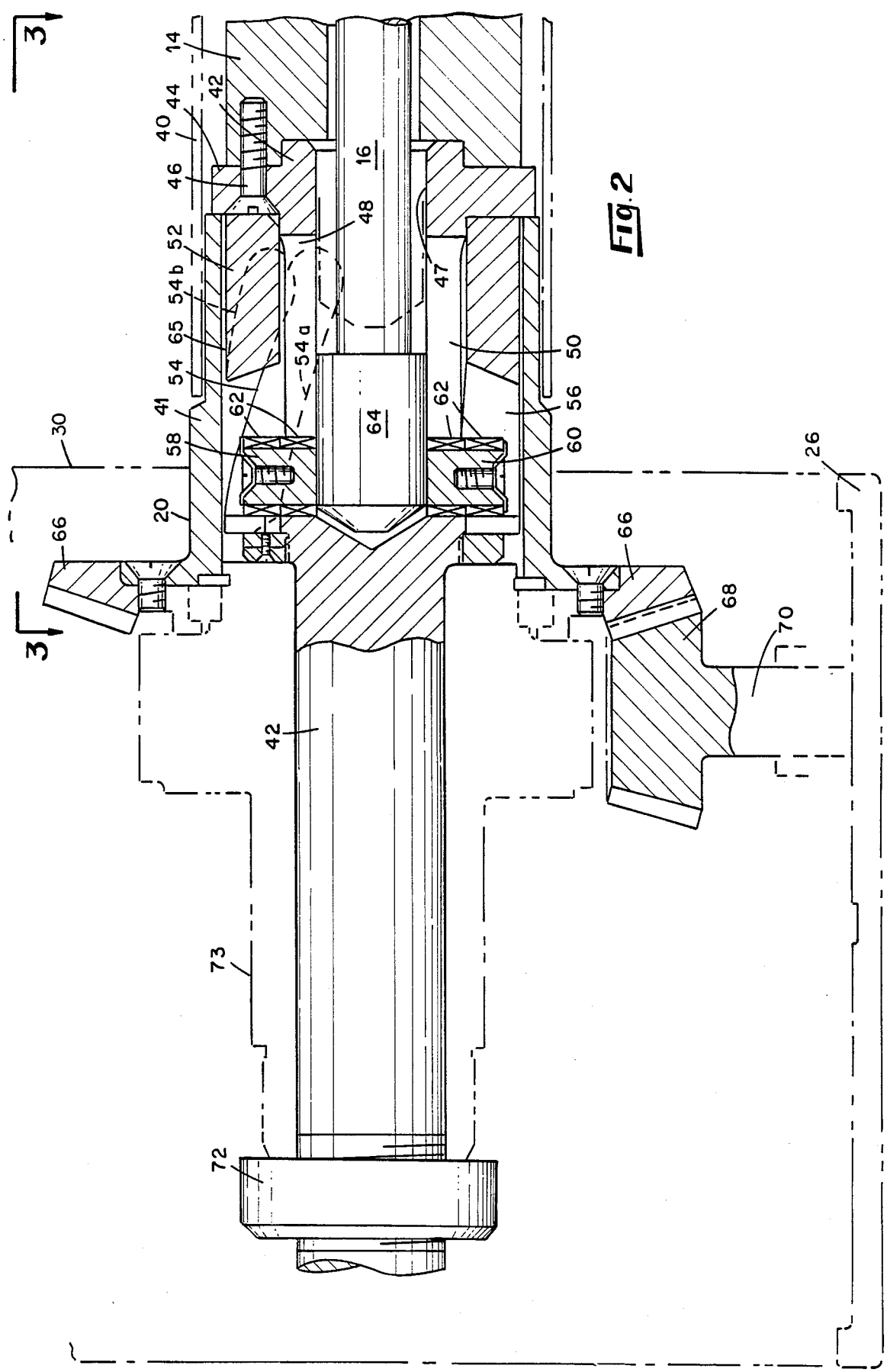
FIG. 2 is a somewhat diagrammatical cross-sectional view of the adapter shown in FIG. 1.

The adapter 18 is one essential element of the combination shown in FIGS. 1 and is illustrated in FIG. 2 by a somewhat diagrammatical cross-sectional view. In this view, a stationery shield 40 is shown encompassing the shafts 14 and 16, and the adapter 18 includes a cylindrical housing 41 that is dimensioned to fit snugly within the shield 40. An adapter output shaft 42 extends through the center of the adapter 18 and includes a mounting flange 44 on one end which is secured to the end of the drive shaft 14 by a machine screw connection 46. Thus, the shaft 42 rotates in unison with the shaft 14 at all times. A center bore 47 is formed in the shaft 42, and slots 48 and 50 extend from the center bore 47 to the exterior of the shaft 42. The slots 48 and 50 are aligned with the longitudinal axis of the shaft 42.

A cylindrical sleeve 52 is mounted for rotation on the shaft 42 and a pair of slots 54 and 56 are formed extending through the cylindrical sleeve 52. The slots 54 and 56 are inclined at an angle of approximately 25 degrees with respect to the center axis of the sleeve 52, but it will be understood that this inclination angle could be varied greatly between, but not including, zero degrees and ninety degrees. Since the slots 54 and 56 are inclined, only portions are showing in FIG. 2, but the dotted lines 54a and 54b represent the positions in space of the edges of slot 54.

A pin 58 is disposed for sliding movement in the slots 48 and 54, and pin 60 is disposed for sliding movement in slots 50 and 56. Roller bearings 62 are provided on the pins 58 and 60 to provide a rolling engagement between the pins 58 and 60 and the slots 48, 50, 54 and 56. The pins 58 and 60 are actually constructed of a single rod or pin which is mounted in a retainer 64 that is attached to the end of the reciprocating shaft 16, such as by machine screws. Hereinafter the pins 58 and 60 will be referred to as pin 58 in reference to adapter 18 and as pin 60 in reference to adapter 100 shown in FIGS. 6-11. The sleeve 52 is free to rotate about the shaft 42, but it has a splined connection 65 to the housing 41 so that rotation of the sleeve 52 will cause rotation of the housing 41. The housing 41 is integrally continuous with the shaft 20 shown in FIGS. 1 and 2 and they may be considered as essentially the same part.

The shaft 20 is connected to drive bevel gears 66 that engage driven bevel gears 68 on shafts 70. The shafts 70 provide the interconnection to the drum segments 26 and move them between the expanded and retracted positions. In FIG. 2, the drum 30 is outlined in phantom lines, and the opposite end of the shaft 42 is shown attached thereto for driving the drum 30. Phantom lines 73 represent a carrier that is mounted on the shaft 42 and carries the driven bevel gears 68, the shafts 70, and the drum segments 26. Thus, the driven bevel gears 68 travel with shaft 42 while the drive bevel gears 66 travel with the shaft 20.

Figure 3:
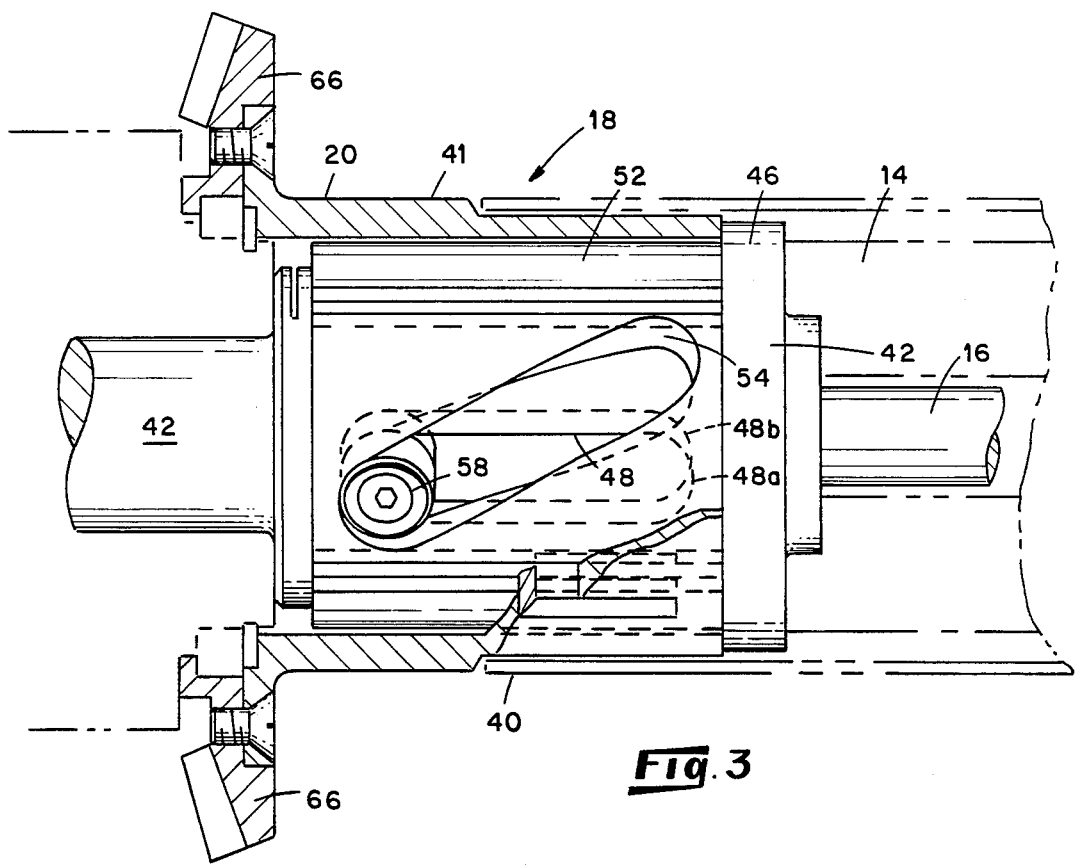
FIG. 3 is a somewhat diagrammatic cross-sectional top view of the adapter taken through lines 3—3 shown in FIG. 2.
Figure 4:
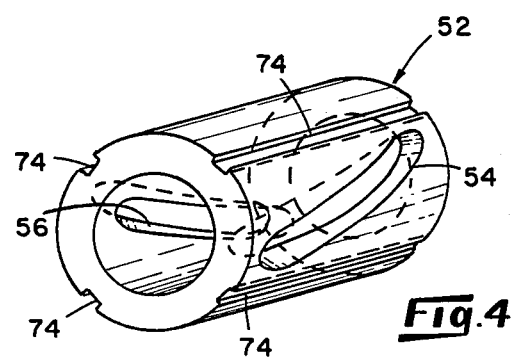
FIG. 4 is a detailed view of a sleeve used to convert between reciprocal motion and rotational motion in the adapter.

Referring now to FIG. 3, there is shown a somewhat diagrammatical top view of the adapter 18 shown taken through lines 3—3 in FIG. 2. FIG. 4 shows a perspective view of the sleeve 52 and, in this view, the grooves 54 and 56 are easily visualized. Also, in FIG. 4, it is shown that the sleeve 54 includes keyways 74 which engage corresponding keys on the interior of the housing 41 to provide the aforementioned splined connection.

The operation of the adapter 18 may best be understood by reference to FIGS. 2, 3 and 4 together. When the pin 58 is in the position shown in FIGS. 2 and 3, the drum segments 26 are in their extended position. When the shafts 14 and 16 are rotated in unison, shaft 42 is rotated directly by shaft 14, and the pin 58 rotates the sleeve 52 which in turn rotates the housing 41 (also the shaft 20). Thus, the shaft 20 and the shaft 42 rotate in unison, and referring to FIG. 3, the beveled gears 66 and 68 rotate in unison. Thus, there is no relative movement between the beveled gears 66 and 68 and the segments 26 remain in the extended position.

In order to move the segments 26 from the extended position to the retracted position, the shaft 16 is moved linearly to the right as shown in FIG. 3 and the pin 58 moves linearly with the shaft 16. As the pin 58 moves to the right, it will travel in the slot 48 that is formed in shaft 42 and it will also travel in the inclined slot 54 in the sleeve 52. As the pin 58 engages the slot 54 during its travel to the right, it will function in a cam fashion and it will rotate the sleeve 52 downwardly as shown in FIG. 3 with respect to the shaft 42. Since the sleeve 52 is splined to the housing 41, the housing 41 and the shaft 20 will also rotate downwardly with respect to the shaft 42. Since the beveled gears 66 are carried by the shaft 20 and the beveled gears 68 are carried by the shaft 42, the relative rotation between the shaft 20 and the shaft 42 will cause the beveled gears 66 to move with respect to the gears 68, the gears 68 will be rotated, and the drum segments 26 will be moved to the retracted position in the conventional manner. To reverse the process, the shaft 16 moved to the left as shown in FIG. 3 which will force the pin 58 back to the position shown in FIG. 3. As the pin 58 moves from its rightmost position in slots 48 and 54 to its leftmost position, the pin and slot combination will again function as a cam and the sleeve 52 and housing 41 will be rotated upwardly. This motion, in turn, will move the beveled gears 66 with respect to gears 68 and return the drum segments 26 to their extended position.

Also, by reference to FIG. 3, it will be appreciated that the adapter 18 may be used in either direction. Although it has been described as producing relative rotating motion between the shafts 42 and 20 by the input of reciprocal motion on the shaft 16, it will be appreciated that relative rotational forces could be applied to shafts 42 and 20 to cause reciprocal motion in the shaft 16.

Figure 5:
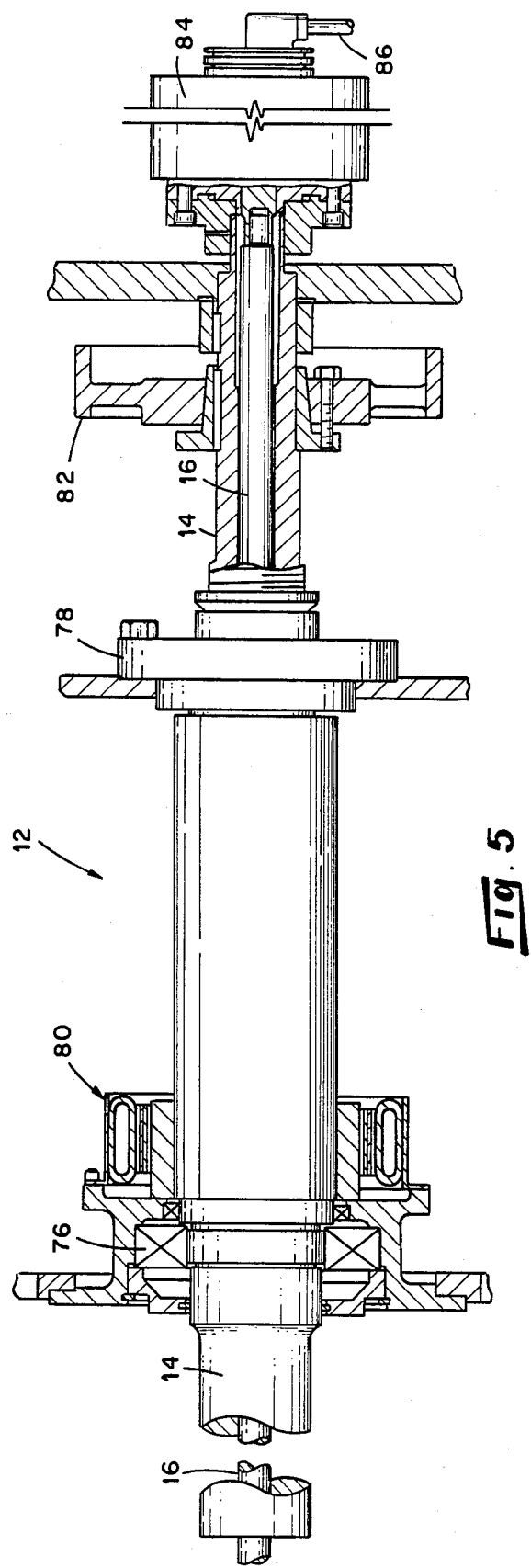
FIG. 5 is a somewhat diagrammatical cross-sectional view of a drive system that rotates an outer shaft and reciprocates an inner coaxial shaft.

In FIG. 5, a detailed view of the reciprocating drive system is shown. This drive is conventional in design and is described herein for purposes of clarity, although it will be understood that any known drive system that produces a reciprocal control motion may be used in the tire drum system described herein. As shown in FIG. 5, the shaft 14 is carried by two main bearings 76 and 78, and a brake 80 is provided within the drive 12 to break the rotation of the shaft 14. On the rightmost side of the shaft 14, a pulley 82 is mounted so that the shaft 14 can be driven by a motor and pulley system. The rightmost end of the shaft 16 is connected to a position and cylinder set 84 that is used to hydraulically drive the shaft 16 in a reciprocal motion within the shaft 14. The piston and cylinder set 84 is controlled remotely and is supplied hydraulic fluid through lines 86, but set 84 could also be pneumatically powered. Referring to FIGS. 2, 3 and 4, it will be appreciated that the shaft 16 is allowed to rotate with the shaft 14, but it is not necessary to apply any rotational forces through the shaft 16 since shaft 14 is designed to supply the necessary rotational force.

Figure 6:
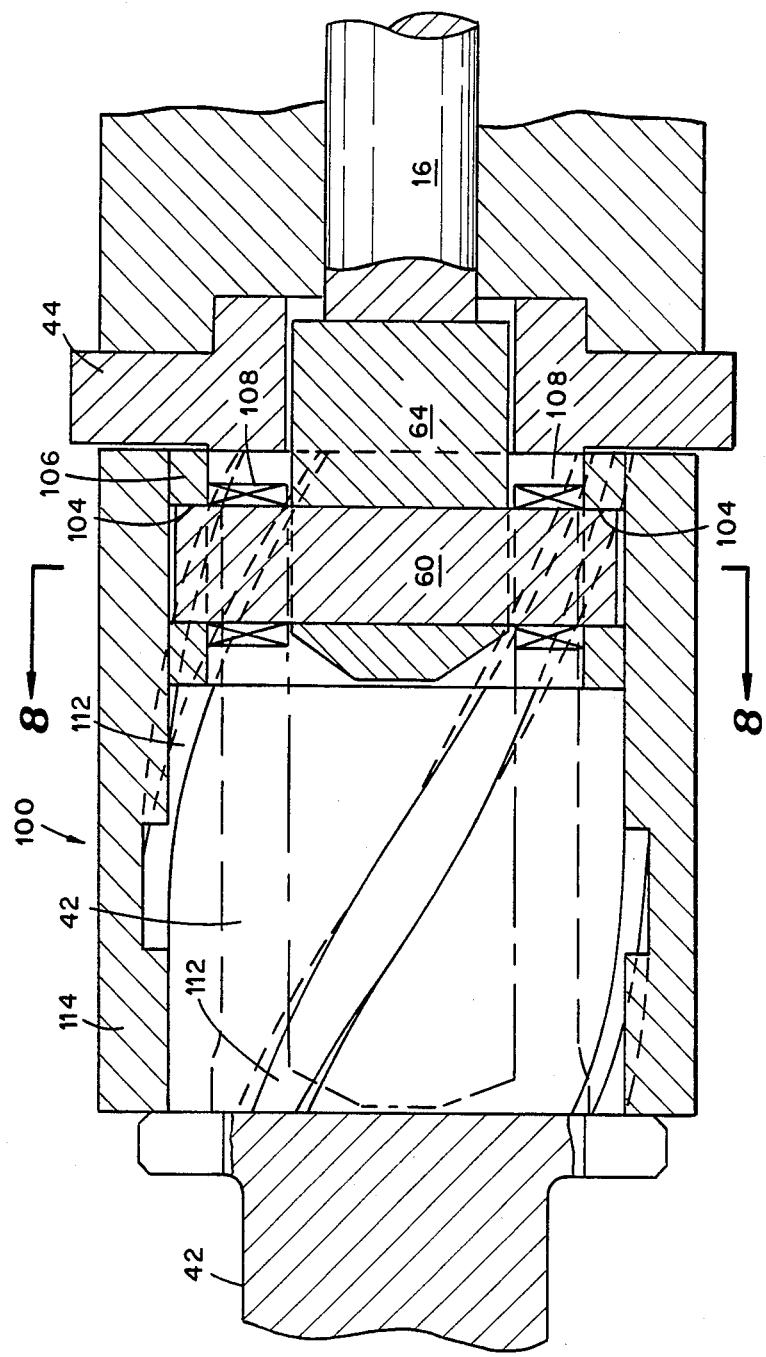
FIG. 6 is a cross-sectional view of a different embodiment of the adapter shown in the collapsed position.
Figure 8:
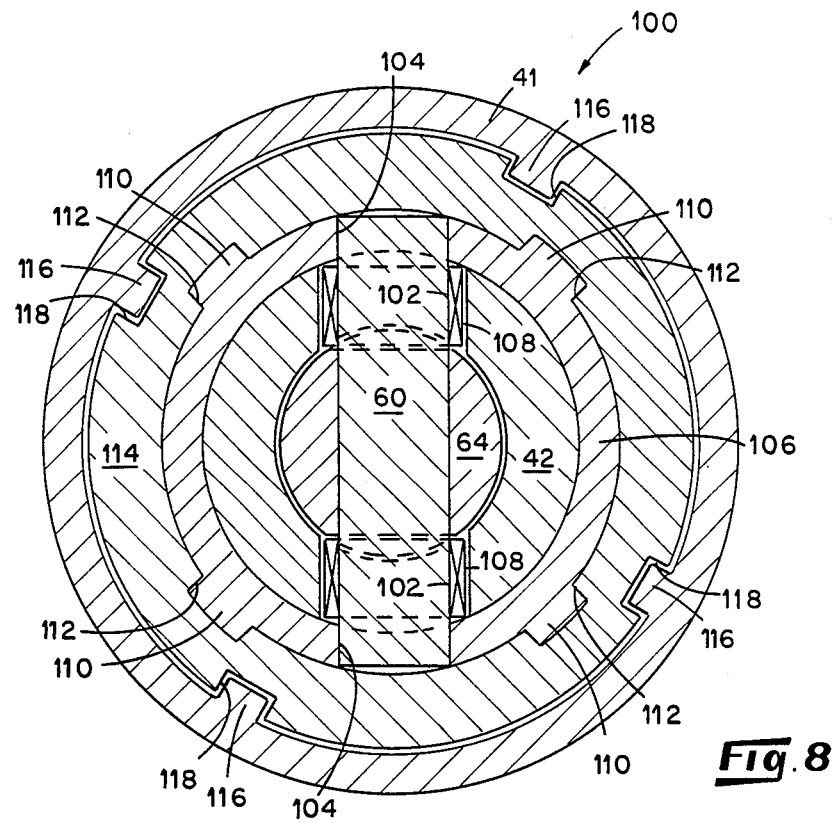
FIG. 8 is a transverse cross-sectional view of the adapter taken through section line 8—8 shown in FIG. 6.

Referring to FIUGRES 6-9, there are shown longitudinal and transverse cross-sections of an adapter 100 that functions identically to the adapter 18 shown in FIGS. 2-4 but it represents a different structural embodiment. The adapter 100 is connected between a drive 12 and a drum 24 in the same manner as adapter 18. That is, the adapter 100 is connected to a reciprocally driven shaft 16 and a rotating shaft 14 from the drive 12 and the output of the adapter is provided through rotating shaft 20 and the adapter shaft output 42. Referring to FIGS. 6 and 8, FIG. 6 illustrates a longitudinal cross-sectional view of the adapter 100 shown in the collapsed position, and FIG. 8 shows a transverse cross-sectional view of the adapter 100 in a collapsed position, the cross-sectional view being shown through lines 8—8 of FIG. 6. In this embodiment, the adapter 100 includes a pin 60 extending through longitudinal slots 102 in the adapter output shaft 42. The pin 60 further extends beyond the circumference of the shaft 42 and into apertures 104 in an inner sleeve 106. Roller bearings 108 are mounted on the pin 60 and disposed in the slots 102 to provide a rolling interaction between the pin 60 and the slots 102. In place of bearings 108, hardened steel bushings may be used if desired. Thus, the slots 102 hold the pin 60 in a fixed angular position with respect to the adapter output shaft 42, but allow the pin to move longitudinally in a direction parallel to the axis of the shaft 42.

The ends of the pin 60 are received in an aperture 104. As best shown in FIG. 6, the sleeve 106 may be moved reciprocally in a direction parallel to the axis of the adapter output shaft 42 by the pin 60 and the retainer 64.

The inner sleeve 106 includes keys 110 that project outwardly therefrom and are received in spiral keyways 112 in an outer sleeve 114. The outer sleeve 114 is attached to the cylindrical housing 41 and the rotating output shaft 20 by longitudinal keys 116 that extend inwardly from the housing 41 and are received in keyways 118 formed in the outer perimeter of the outer sleeve 114. The connection provided by the keys 116 and the keyways 118 may be considered a splined connection.

Figure 7:
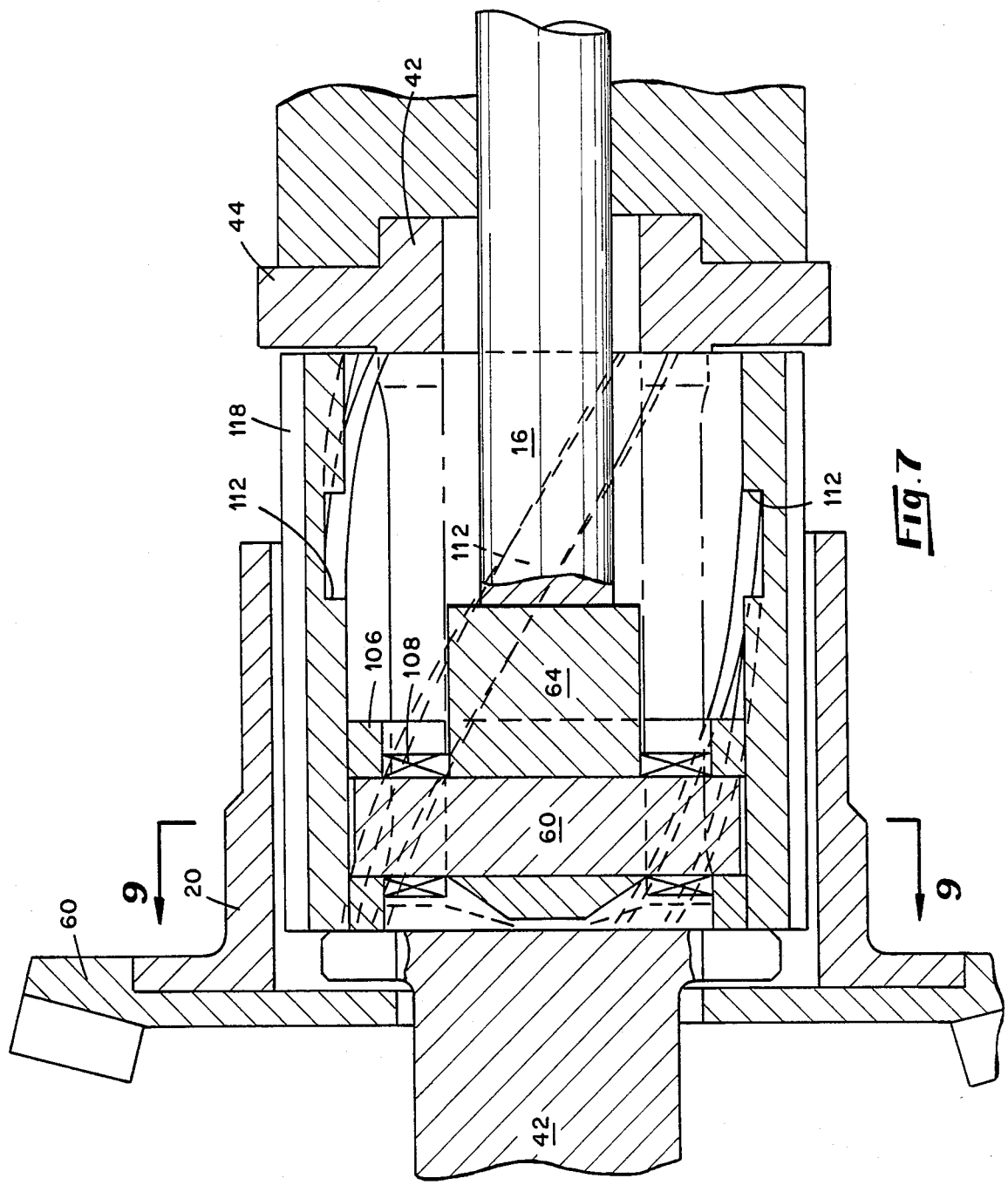
FIG. 7 is a cross-sectional view of the adapter of FIG. 6 shown in the expanded position.
Figure 9:
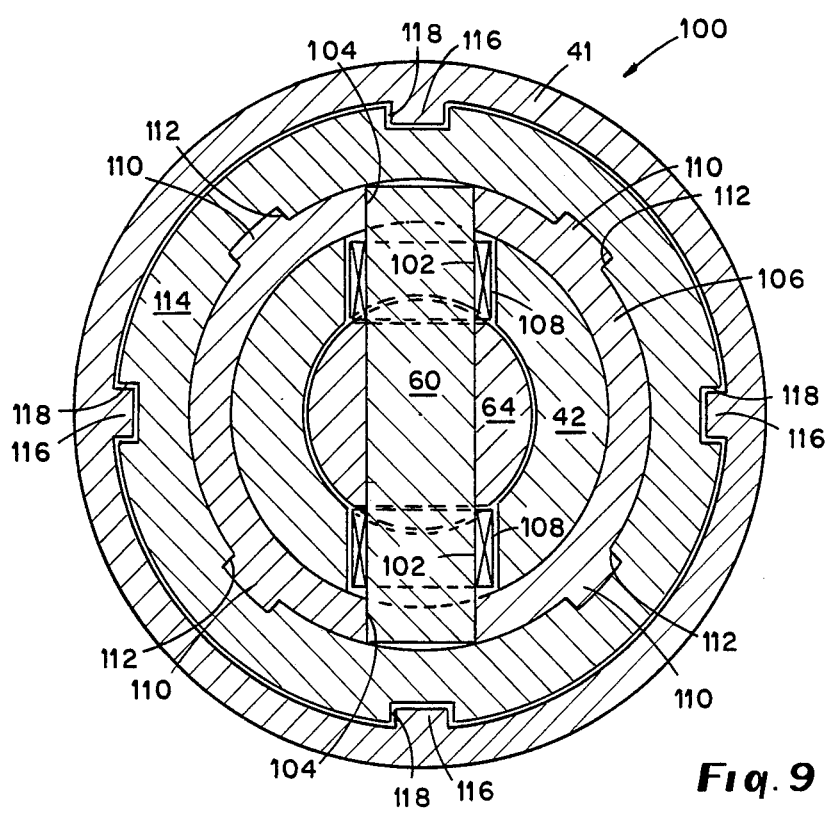
FIG. 9 is a cross-sectional view of the embodiment shown in FIG. 7 taken through section lines 9—9 of FIG. 7.
Figure 10:
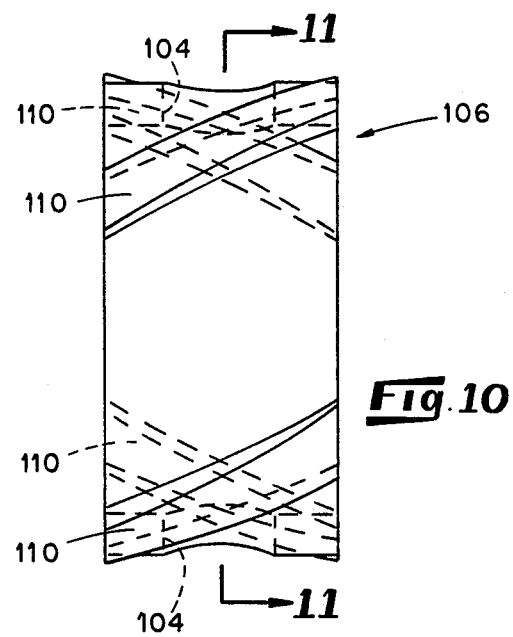
FIG. 10 is a longitudinal cross-sectional view of an inner sleeve with helical grooves used in the embodiment shown in FIGS. 6–9.

Referring now to FIGS. 6-9, it will be appreciated that as the inner sleeve 106 is moved from the collapsed position as shown in FIG. 7 to the expanded position as shown in FIG. 8, the keys 110 of the inner sleeve 106 will move in the spiral keyways 112 and will rotate the outer sleeve 114 from the position shown in FIG. 9 to the position shown in FIG. 10. The outer sleeve 114, in turn, will rotate the housing 41 and rotating shaft 20 relative to the output shaft 42. In this manner, as previously described, the drum segments 26 will be moved from the collapsed position to the expanded position. During the movement of the inner sleeve 106, its rotational position relative to the shaft 42 is held stationary by the pin 60 that is moving within the grooves 102 in the shaft 42. Thus, the inner sleeve 106 interacting with the spiral keyways 112 causes the outer ring to rotate in the manner described. This interaction between the inner sleeve 106 and the outer sleeve 114 is considered to be a cam action.

Figure 11:
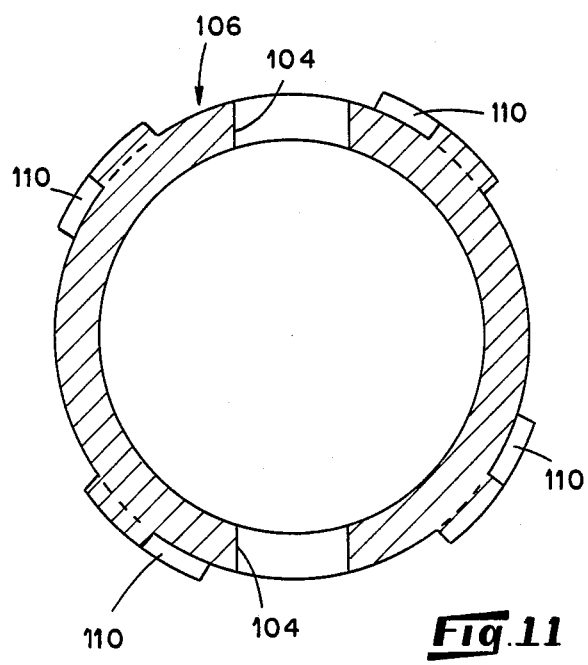
FIG. 11 is a transverse cross-sectional view of the sleeve shown in FIG. 10.

FIG. 10 is a somewhat diagrammatical side view of the inner sleeve 106 and FIG. 11 is a cross-sectional view of the sleeve 106 taken through lines 11—11 as shown in FIG. 10. In this view, it will be appreciated that the keys 110 formed on the circumference of the sleeve 106 are not longitudinal. Instead, they spiral at an angle equal to that of the spiraled keyways 112. Thus, a substantial surface area is provided to carry the load between the keys 110 and the keyways 112.

Having fully described embodiments of the invention, it will be appreciated that a small, compact and economical adapter 18 or 100 has been provided for combining a drive 12 and drum 24 or a drive 32 and drum 36 that would otherwise be incompatible. By reference to FIGS. 3 and 6, it will be appreciated that the adapter system only slightly increases the distance between the drive 12 or 32 and the drum 24 or 38 and since the inclination and length of the slot 54 of adapter 18 will control the amount of relative rotation between the shafts 42 and 20, it is not necessary to impose additional control mechanisms to limit the travel of the pin 58 or the shaft 16.

Although the present invention has been described with reference to particular embodiments, it will be appreciated that the invention is capable of numerous rearrangements, modifications or substitutions of parts without departing from the scope or spirit of the invention as defined in the appended claims. In particular, it should be noted that there is no intention to limit the invention to a particular drum or drive system, it being understood that the drives and drums used in the present invention are conventional in design.

What is claimed is:

1. In combination, a tire building machine comprising:
    a tire building drum having collapsible segments forming an outer drum periphery and being movable between extended and retracted positions, said tire building drum including at least one rotatable shaft and means for connecting said collapsible segments to said rotatable shaft for moving said segments between the extended and retracted positions in response to rotation of said rotatable shaft;
    drive means for rotating the drum and including an actuation mechanism that is movable between first and second positions relative to said collapsible segments; and
    adapter means connected between said actuation mechanism and said rotatable shaft for rotating said rotatable in response to movement of said actuation mechanism between the first and second positions, whereby the collapsible segments may be extended and retracted by the rotation of said rotatable shaft in response to the movement of said actuation mechanism as aforesaid.

2. The machine of claim 1 wherein said adapter means further comprises a cam mechanism connected between said rotatable shaft and said actuation mechanism.

3. The machine of claim 1 wherein said adapter means further comprises:
    a cylindrical output shaft;
    means for mounting said cylindrical output shaft for rotation about its center axis; and a cam interconnection between said actuation mechanism and said cylindrical output shaft for rotating said cylindrical output shaft in response to movement of said actuation mechanism between said first and second positions.

4. The machine of claim 1 wherein said adapter means further comprises:
a cylindrical sleeve;
means for mounting said cylindrical sleeve in said adapter for rotation about its center axis; and
a pin and groove interconnection between said actuation mechanism and said sleeve for rotating said cylindrical sleeve in response to movement of said actuation mechanism between said first and second positions.

5. The machine of claim 1 wherein said adapter means further comprises:
a cylindrical sleeve;
means for mounting said cylindrical sleeve in said adapter for rotation about its center axis;
a groove formed in said sleeve in an orientation inclined with respect to the center axis of said sleeve; and
a pin disposed for sliding movement in said groove and being connected to said actuation mechanism for movement therewith, whereby movement of said actuation mechanism between said first and second positions causes linear motion of said pin in said groove and rotation of said sleeve.

6. In combination, a tire building machine comprising:
a tire building drum having collapsible segments forming an outer drum periphery and movable between extended and retracted positions, said tire building drum including first and second rotatable shafts with the drum segments being mounted for rotation on said first rotatable shaft and the collapsible segments being movable between the extended and retracted positions in response to rotational movement of said second shaft;
drive means having a drive shaft that is rotatably driveable and an actuation mechanism that is selectively driveable in a reciprocal motion between first and second displaced positions; and
adapter means connected between said drive shaft and said first rotatable shaft and between said actuation mechanism and said second rotatable shaft for rotating said first rotatable shaft in response to rotation of said drive shaft and for rotating said second rotatable shaft in response to reciprocal movement of said actuation mechanism to extend and retract said segments.

7. The machine of claim 6 wherein said adapter means further comprises:
a linkage between said drive shaft and said first rotatable shaft for rotating said first rotatable shaft; and
a cam mechanism between said actuation mechanism and said second rotatable shaft for rotating said second rotatable shaft in response to reciprocal motion of said actuation mechanism.

8. A tire building apparatus, comprising: an adapter connected between a tire building drum and drive means, said building drum having collapsible segments forming an outer drum periphery and movable between extended and retracted positions, said tire building drum including first and second coaxial rotatable shafts with said segments being mounted for rotation with said first rotatable shaft and said segments being movable between the retracted and extended positions in response to rotation of said second rotatable shaft relative to said first rotatable shaft, and said drive means having a rotatably driven drive shaft and a coaxially mounted reciprocally driven actuation shaft, said adapter comprising first mechanism means connected between said rotatably driven drive shaft and said first rotatable shaft for rotatably driving said first rotatable shaft, and second mechanism means connected between said reciprocally driven shaft and said second rotatable shaft for rotating said second rotatable shaft with respect to said coaxial first rotatable shaft in response to reciprocal motion of said actuation shaft.

9. The machine of claim 8, wherein said second mechanism means further comprises a cam mechanism connected between said actuation shaft and said second rotatable shaft.

10. The machine of claim 8, wherein said second mechanism further comprises a cylindrical output shaft;
means for mounting said cylindrical output shaft for rotation about its center axis; and
a cam interconnection between said actuation shaft and said cylindrical output shaft for rotating said cylindrical output shaft in response to reciprocal movement of said actuation shaft.

11. The machine of claim 8, wherein said second mechanism comprises:
a cylindrical sleeve;
means for mounting said cylindrical sleeve for rotation about its center axis; and
a pin and groove interconnection between said actuation shaft and said sleeve for imparting rotational movement to said cylindrical sleeve in response to reciprocal movement of said actuation shaft.

12. An adapter for connection between a tire building drum and a drive system for mechanically connecting a rotatable shaft and a reciprocally movable mechanism comprising:
first adapter means connected to said rotatable shaft;
second adapter means connectable to said reciprocally moving mechanism;
first and second rotatable adapter shafts disposed coaxially on said adapter;
first interconnection means for connecting said first adapter means to said first and second adapter shafts for rotating said first and second adapter shafts when said first adapter means rotates; and
second interconnection means for connecting said second adapter means to said first and second adapter shafts for rotating said second shaft relative to said first shaft when said second adapter shaft is operatively connected to the reciprocally moving mechanism and the reciprocally movable mechanism moves reciprocally.

13. The adapter of claim 12, wherein said second interconnection means comprises a cam mechanism operating on said second output means;

14. The adapter of claim 12 wherein said second interconnection means comprises a pin and slot mechanism reciprocally driven by said control mechanism to rotate said second output relative to said first output.

15. The adapter of claim 12, wherein said second interconnection comprises:
a cylindrical sleeve for rotating said second output;
a slot formed in said cylindrical sleeve and being inclined with respect to the longitudinal axis of said sleeve at an angle of greater than zero degrees and less than 90 degrees;

a pin disposed in said slot; and means for reciprocally driving said pin in a linear direction in response to reciprocal motion of said control mechanism to rotate said sleeve and second output relative to said first output.

16. The adapter of claim 12, wherein said second interconnection means includes a key and keyway mechanism reciprocally driven by said control mechanism to rotate said second output relative to said first output.

17. The adapter of claim 12, wherein said second interconnection comprises:

a cylindrical sleeve for rotating said second output;

a keyway formed in said cylindrical sleeve so that said keyway spirals along the inside surface of said sleeve;

means defining a key disposed in said keyway; and means for reciprocally driving said key longitudinally of said sleeve in response to reciprocal motion of said control mechanism to rotate said sleeve and second output relative to said first output.

18. An adapter for connection between a tire building drum and a drive system having a rotatably driven drive shaft and a rotatably and reciprocally driven actuation shaft mounted coaxially within said drive shaft comprising:

a hollow adapter shaft for attachment to said drive shaft for rotation therewith;

a shaft slot formed in and through said adapter shaft and being oriented in a direction parallel to the center axis of said adapter shaft;

a sleeve mounted for rotation on said adapter shaft;

a sleeve slot formed in said sleeve at an angle of greater than zero degrees and less than 90 degrees with respect to the center axis of said sleeve;

a pin disposed for sliding movement in said slots;

means for connecting said pin to said actuation shaft for reciprocally driving said pin in response to reciprocal motion of said actuation shaft;

a first output member connected to said adapter shaft and associatable with the building drum; and a second output member connected to said sleeve, associatable with the building drum and being co-axial with said first output member, said first and second output members being rotatable together by rotation of said drive shaft, said first and second output members being rotatable relative one to the other by reciprocal movement of the actuation shaft, and said pin being movable in said slots to rotate said sleeve on said adapter shaft and to thereby rotate said first and second output members one relative to the other.

* * * * *

UNITED STATES PATENT AND TRADEMARK OFFICE
CERTIFICATE OF CORRECTION

PATENT NO. : 4,780,171

DATED : October 25, 1988

INVENTOR(S) : Mark S. Byerley

It is certified that error appears in the above-identified patent and that said Letters Patent is hereby corrected as shown below:

Column 1, line 40 "capatible" should be --compatible--; and
Column 4, line 41 after "16" insert --is--; and
Column 5, line 1 "position" should be --piston--; and
Column 5, line 12 "FIUGRES" should be --FIGURES--; and
Column 6, line 55 after "rotatable" insert --shaft--.

Signed and Sealed this

Second Day of May, 1989

Attest:

DONALD J. QUIGG

Attesting Officer

Commissioner of Patents and Trademarks